Aug. 9, 1955    E. W. MICHENER ET AL    2,715,089

FLEXIBLE COVERING SHEET AND METHOD OF MAKING THE SAME

Filed April 27, 1953

Inventors
ELLIOTT W. MICHENER
RICHARD C. FRANSEEN

By Howard L. Fischer

Attorney

United States Patent Office 2,715,089
Patented Aug. 9, 1955

2,715,089

FLEXIBLE COVERING SHEET AND METHOD OF MAKING THE SAME

Elliott W. Michener and Richard C. Franseen, St. Paul, Minn.

Application April 27, 1953, Serial No. 351,118

6 Claims. (Cl. 154—125)

This invention relates to a wrapping or covering material adapted to be made of two outside sheets of thin transparent or translucent plastic material with a center sheet of metallic foil. The metallic foil is formed with regularly spaced or irregularly spaced holes, and the outside plastic covering sheets are adapted to be laminated to the metallic foil sheet by a heating and pressure process which is adapted to cause the outside sheets to contact through the holes and be laminated or fused together, thereby firmly securing the outer flexible plastic sheets to each other and to the metallic foil sheet.

While the covering sheet herein set forth may be made by various processes, we have found that one method consists in providing a metallic foil sheet having perforations therein, then positioning plastic sheets on either side of the metallic foil or sheet, and then applying pressure and heat to laminate the sheets together, causing the flexible plastic sheets which may be translucent or transparent to contact through the holes of the metallic sheet, the plastic sheets being of a nature to be fused together by heat when in contact under heat and pressure.

A feature of our covering material resides in forming a strong, flexible sheet which may be folded over objects to be covered thereby and cause to retain the folded shape until the covering is removed from the object over which it has been folded. The cover sheet may be removed and straightened or smoothed out into a flat state. The sheet may be washed to cleanse the same while extending out flat and may be stored away for future use.

It is a feature to provide a covering sheet which may be used again and again. The perforations through the metallic foil sheet may be of any suitable size, shape, or form, and, if desired, a larger opening may be formed in the metallic foil which large opening may be surrounded by smaller openings, the large opening forming a window where the sheet is used to cover a dish containing food or other material.

The nature and properties of our covering sheet combine to make a unique material for covering refrigerator jars, wrapping goods for deep freeze, as well as protecting machinery, tools, or other objects during shipping or when in storage.

A further feature of our covering sheet resides in providing a metallic foil which may be printed upon to indicate various display indicia as well as for advertising purposes or to indicate a name of a particular place of business. In fact, our covering material has a multiplicity of uses which may be used in a decorative sense as well as a a display and also to cover objects as herein above set forth.

It is apparent that the intermediate sheet of foil material may be perforated in a variety of ways, such as floral designs or by letters of the alphabet spelling out the desired advertising, name, or by representing a trademark or other illustrations adapted to be formed by the perforations which are formed in the intermediate foil sheet.

It will also be apparent that the plastic outer covering sheets may be sealed together through the openings formed in the intermediate foil sheet not only by heat, but also by solvents or adhesives.

In the drawings forming part of this specification:

The drawings illustrate our flexible covering sheet A which is adapted to be formed by our method consisting in providing a metallic foil sheet of aluminum or other material having a thin nature and perforating the same to form openings 10 therethrough. The openings 10 having a diameter or width of not less than $\frac{1}{16}$th of an inch may be round or square, or any other suitable shape.

The method continues by placing the perforated metallic foil sheet between thin, flexible, plastic sheets 11. The sheets 11 may be formed of any suitable material and may be transparent or translucent. It is desirable that the sheets 11 be of a nature that they will be caused to adhere to each other when pressed together under heat.

The process continues by subjecting the sheets 11 and the metallic foil sheet 12 which has been placed between the sheets 11 to heat and pressure which causes the portions 11' of the sheets 11 to be pressed together through the openings 10 formed in the metallic foil sheet. This causes the portions 11' of the sheet 11 to fuse together and virtually become integral through the openings 10 throughout the area of the covering sheet A.

Figure 1:
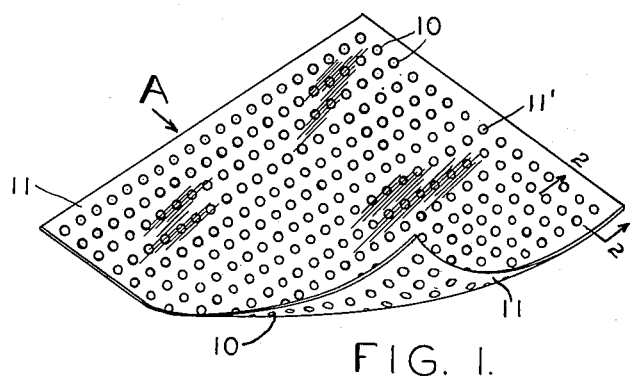
Figure 1 is a perspective of our covering sheet with one corner thereof turned up.
Figure 2:
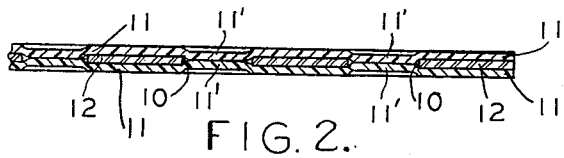
Figure 2 is a section on the line 2—2 of Figure 1.
Figure 4:
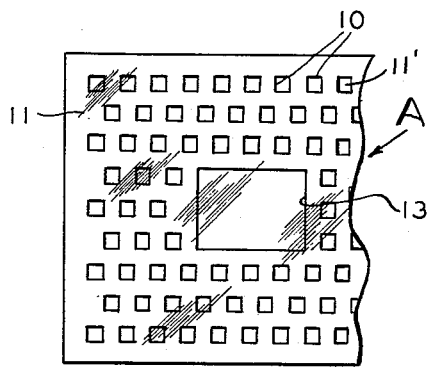
Figure 4 is a plan view of the form of covering sheet shown in Figure 3.
Figure 3:
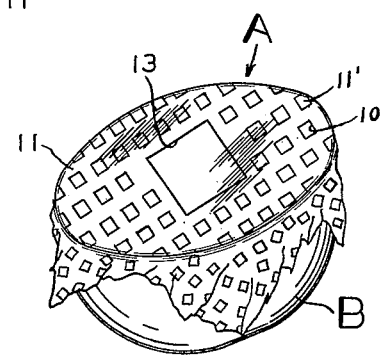
Figure 3 shows our covering sheet draped over a bowl.
Figure 5:
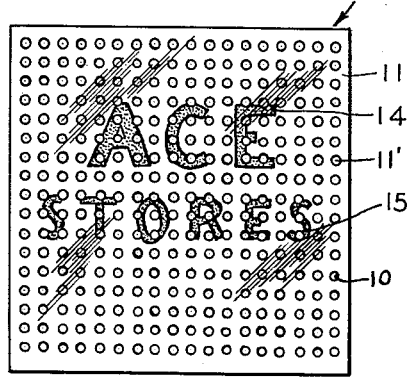
Figure 5 illustrates our covering sheet with indicia thereon which may be printed or impressed on the covering sheet or on the metal foil between the covering sheets.
Figure 6:
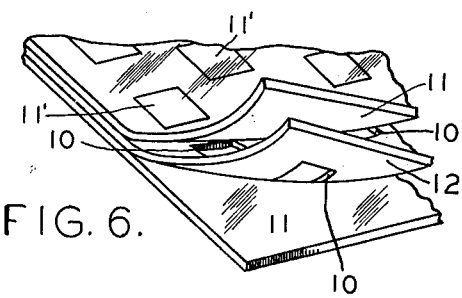
Figure 6 is an enlarged detailed perspective view of a portion of a corner of our sheet with the layers separated slightly.

The sheet A may be formed with a window 13 while the same is surrounded with the smaller openings 10 and thus the window provides a means of displaying the goods carried in a dish such as the bowl B illustrated in Figure 3.

The sheet A may also be formed with a uniform number of fairly large holes 10 without the window portion 13, and this permits the article covered by the sheet A to be visible through the openings 10.

When it is desired, indicia such as 14 and 15 may be imprinted either on the metallic foil sheet 12 or on the surface of either of the sheets 11 so as to display the desired indicia thereon which may include advertising subject matter or the name of a store or place of business or any other illustration desired. When the indicia 14 and 15 is imprinted on the metallic foil, the sheets 11 cover the same to protect the indicia against wear and from being rubbed off or washed off when the sheets A are cleansed.

A primary feature of our covering sheet A resides in the flexibility obtained over ordinary metallic foil sheets such as aluminum foil and other thin foil sheets which have been used heretofore to cover objects.

With our sheet A the same is so flexible that it can be used over and over again without breaking down like ordinary aluminum foil and tin foil sheets. Our process of making the same increases the flexibility and protects the metallic foil so as to make it stronger and longer wearing together with increased flexibility owing to the perforated nature of the foil which we use.

Further, the method adheres the flexible plastic sheets together through the openings and thus protects the breaking of the foil at the point of opening therein. Even though our cover sheets A had been used a large number of times they can be readily pressed out flat by hand and washed clean at any time by wiping over the surface of the plastic sheets 11.

The sheet A is not to be used on articles which are ordinarily wrapped in tin foil or aluminum foil and baked in an oven under high heat.

In carrying out our method of forming a covering sheet which is tough and may be used repeatedly, it is desirable to have it understood that the outer plastic covering sheets which are adapted to cover the intermediate foil sheet may be adhered to said intermediate sheet in any suitable manner, and the covering sheets may be adhered together by heat or by solvents or an adhesive or in any other suitable manner to firmly anchor the covering sheets in place, extending over the intermediate foil sheet.

Further, it is important that our covering sheet may be made up in a manner wherein the intermediate foil sheet may be perforated with different designs, such as trademarks, lettering, displays, or advertising indicia. Thus, the display formed in the intermediate foil sheet will be visible through the covering sheets and protected thereby. In use we have found that our covering sheet is desirable because it will virtually assume the shape of the article over which it is folded; furthermore, it protects the article against the outer atmosphere, and this covering sheet may be used over and over again owing to its tough nature and because it is wear resistant, and the covering sheet may be ironed out flat after it has been used over an irregular object and may also be cleansed readily, thereby providing a sanitary covering for dishes and articles which are stored in a refrigerator or which may be placed in the freezing compartment.

We claim:

1. A composite wrapper including a pair of flat, flexible outer sheets, an intermediate formable metallic foil sheet having a series of openings not less than $\frac{1}{16}$th of an inch in diameter and width formed therein, and means for securing said outer sheets together through said openings in said intermediate sheet to provide a tough, flexible, composite foldable sheet wherein the intermediate sheet is protected by said outer sheets against breaking.

2. A foldable wrapper including a pair of flat translucent, flexible unperforated outer sheets, an intermediate flexible, opaque sheet member having a series of openings of $\frac{1}{16}$th of an inch or larger formed therethrough, and means for heat sealing and fusing said outer sheets to join the same through the openings formed in said intermediate sheet.

3. A flexible, composite wrapping unit comprising outer sheet members formed of thin plastic which are adapted to be readily heat sealed together, an intermediate formable metallic foil sheet having a series of holes formed therethrough, said outer sheets being heat sealed together through the openings in said intermediate sheet, thereby forming a unitary composite foldable sheet which is adapted to assume the shape into which it is folded so as to act as a cover when desired and permitting said composite sheet to be removed and ironed out flat for repeated use as a flexible covering material without rupture of said foil sheet.

4. The method of making a covering sheet or wrapping consisting in providing unperforated continuous flexible plastic outer sheets having a transparent or translucent nature, then providing an intermediate metallic foil sheet, then forming a series of holes through the metallic sheet, then positioning the metallic sheet between the outer plastic sheets and laminating or fusing the outer sheets together through the holes formed through the intermediate metallic foil sheet, thereby providing a flexible wrapping sheet which may be used over and over without rupture and readily cleansed by wiping off the outer surface thereof.

5. The method of forming a composite sheet consisting in providing an inner formable metallic foil sheet, then forming a series of holes through the metallic foil sheet and forming an enlarged window hole therein, then placing the metallic foil sheet between plastic sheets which are adapted to form the outer surface of the composite sheet, and then laminating or fusing the outer sheets to the surface of the inner metallic foil sheet and causing the outer plastic sheets to be joined together integrally through the openings formed in the inner metallic foil sheet.

6. In a composite wrapper, a pair of thin, flexible, plastic, unperforated outer sheets, an intermediate formable thin metallic foil sheet having a series of openings formed therethrough, said outer sheets being fused together through said openings, said openings having an area equal to at least $\frac{1}{16}$th of an inch in width and of such an area that said outer sheets are fused together with a substantially flat contacting area.

References Cited in the file of this patent

UNITED STATES PATENTS

| | | |
|---|---|---|
| 1,609,222 | Taylor | Nov. 30, 1926 |
| 1,944,323 | Kilching | Jan. 23, 1934 |
| 2,003,494 | Reynolds | June 4, 1935 |
| 2,070,023 | Olsen | Feb. 9, 1937 |
| 2,071,921 | Dickson | Feb. 23, 1937 |
| 2,304,263 | Luty | Dec. 8, 1942 |
| 2,511,303 | Stevens et al. | June 13, 1950 |
| 2,633,655 | Langan | Apr. 7, 1953 |